United States Patent [19]

Churchill et al.

[11] 4,127,549

[45] Nov. 28, 1978

[54] METHOD FOR IMPROVING THE SCRUB-RESISTANT PROPERTIES OF WATER-BASED LATEX PAINT COMPOSITIONS

[75] Inventors: Charles M. Churchill; George A. Allen, both of Spartanburg; John F. Stadalsky, Campobello, all of S.C.

[73] Assignee: Milliken Research Corporation, Spartanburg, S.C.

[21] Appl. No.: 818,354

[22] Filed: Jul. 25, 1977

Related U.S. Application Data

[63] Continuation-in-part of Ser. No. 738,636, Nov. 3, 1976, abandoned.

[51] Int. Cl.$^2$ .................... C09D 3/74; C09D 3/80; C09D 5/02
[52] U.S. Cl. .................... 260/29.6 E; 260/29.6 ME
[58] Field of Search .................... 260/29.6 E, 29.6 ME, 260/613 B

[56] References Cited

U.S. PATENT DOCUMENTS

| | | | |
|---|---|---|---|
| 2,213,477 | 9/1940 | Steindorff et al. | 260/613 B |
| 2,630,457 | 3/1953 | Hansen et al. | 260/613 B |
| 3,112,282 | 11/1963 | Jones et al. | 260/29.6 ME |
| 3,226,349 | 12/1965 | Cull | 260/29.6 ME |
| 3,264,238 | 8/1966 | Wallen | 260/29.6 ME |
| 3,758,432 | 9/1973 | Hopper | 260/29.6 ME |
| 3,759,861 | 9/1973 | Shimokawa | 260/29.6 E |
| 4,001,159 | 1/1977 | Imai et al. | 260/29.6 ME |

*Primary Examiner*—Ronald W. Griffin
*Attorney, Agent, or Firm*—Glen M. Burdick; H. William Petry

[57] ABSTRACT

The scrub-resistant properties of water-based latex paint compositions are readily improved by incorporating into such paint compositions an effective minor amount of an alkoxylate obtained by alkoxylating an alkylation reaction product formed by the acid catalyzed alkylation of a phenolic compound with a benzyl halide, or substituted benzyl halide, the alkoxylate further characterized as containing from about 6 to about 30 alkoxy units per molecule.

5 Claims, No Drawings

METHOD FOR IMPROVING THE SCRUB-RESISTANT PROPERTIES OF WATER-BASED LATEX PAINT COMPOSITIONS

This application is a continuation-in-part of our copending application Ser. No. 738,636, filed Nov. 3, 1976, now abandoned.

This invention relates to a method for improving the scrub-resistant properties of water-based latex paint compositions. In one aspect it relates to the use of alkoxylates to impart improved scrub-resistant properties to such paint compositions.

Water-based paint formulations, more commonly known as latex paint compositions, have, in recent years, found wide acceptance for the coating of surfaces, both interior and exterior. Such latex paints consist basically of pigment and a latex emulsion. However, other additives, such as pigment-dispersing agents, preservatives, thickeners, defoamers, and freeze-thaw stabilizers are also employed to impart the desired properties to the latex paints. While latex paint compositions are generally more rapid drying, possess improved weathering characteristics, and are more light-fast than the organic solvent or oil base paints, problems have, nonetheless, been encountered in that often the scrub-resistant properties, e.g., scrubbability characteristics, of water-based latex paints are less than desirable. Thus, a need has long been recognized for improved water-based latex paint formulations which have improved scrub-resistant properties, while maintaining other desired properties such as quick drying, weathering, and light-fastness. It is to such an improvement that the present invention is directed.

According to the present invention, we have now discovered a method for improving the scrub-resistant properties of water-based latex paint compositions which comprises incorporating into such paint compositions a minor effective amount of an alkoxylate obtained by alkoxylating an alkylation reaction product formed by the acid catalyzed alkylation of a phenolic compound with a benzyl halide, or substituted benzyl halide. The degree of alkoxylation employed to produce the desired alkoxylate can vary widely, but is generally that amount sufficient to provide from about 6 to about 30 alkoxy units per molecule of the alkoxylate.

The alkylation reaction product intermediate employed to form the alkoxylates for incorporation into water-based latex paint compositions to improve the scrub-resistant properties of such paint compositions can be formed by the acid catalyzed alkylation of a phenolic compound with a benzyl halide or a substituted benzyl halide employing any suitable alkylation procedure well known in the art. The particular phenolic compound employed can also vary widely, but will generally be selected from the group consisting of phenol, alkyl substituted phenols, aryl substituted phenols, alkyl aryl substituted phenols and mixtures thereof.

Such phenolic compounds can be represented by the general formula:

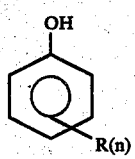

wherein R is an alkyl group containing from 1 to about 12 carbon atoms, an aryl group such as phenyl, and the like, or an alkyl aryl group in which the alkyl and aryl moieties are as previously described, and $n$ is an integer of 0, 1, 2, 3 or 4.

The alkylating agent employed to produce the alkylation reaction product intermediate can be any suitable benzyl halide or substituted benzyl halide. The term "substituted benzyl halide" as employed herein is to be understood to include compounds such as alpha-alkyl substituted benzyl halide, mono-or polyalkyl substituted benzyl halides, mono-or polyaryl substituted benzyl halides, mono-or polyalkylaryl substituted benzyl halides, and mixtures thereof.

Such alkylating agent, e.g., the benzyl halide or substituted benzyl halide, can be represented by the general formula:

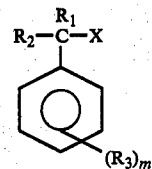

wherein $R_1$, $R_2$ and $R_3$ are hydrogen, an alkyl group containing from 1 to about 12 carbon atoms, an aryl group, such as phenyl, and the like, or an alkyl aryl group in which the alkyl and aryl moieties are as previously described, $n$ is an integer of 0, 1, 2, 3, 4 or 5 and X is a halogen, e.g., F, Cl, Br or I.

The alkylation temperatures employed in producing the alkylation reaction product will vary widely but will generally be from about 50° C. to about 150° C. Desirable results have been obtained when the alkylation temperature is from about 120° C. to about 140° C., the alkylating agent is benzyl chloride and the phenolic compound is phenol.

The ratio of phenolic compounds, specifically phenol, to halogenated benzyl constituent alkylating agent can also be varied over wide limits. However, it is desirable that the alkylating agent be employed in at least a stiochiometric amount based upon the amount to phenolic compound. Generally it is desirable to employ a molar ratio of the phenolic compound to the alkylating agent in the range from about 1:1 to about 1:2, respectively.

The amount of alkylating catalyst employed to effect the alkylation reaction between the phenolic compound and the halogenated benzyl compound can vary widely, such depending to a large extent upon the particular catalyst chosen. However, the amount of catalyst employed will generally range from about 0.5 to about 10 weight percent, based upon the amount of alkylating agent employed in the reaction. Likewise, any suitable acid catalyst which can effectively initiate the alkylation reaction between the phenolic compound and the halogenated benzyl compound can be employed. Typical of such acid catalysts are zinc chloride, aluminum chloride, $BF_3$, $H_2SO$, $H_3PO_4$, and mixtures thereof.

The alkylation reaction can be carried out in a continuous or batch wise manner. In either manner, effective contact time between the catalyzed reactants is in order of from about 15 minutes to about 60 minutes. The precise time needed for effecting alkylation is obviously dependent upon a number of factors, including the amount of catalyst used, the ratio of phenolic compound of halogenated benzyl compound, temperature, pressure, and the like.

Once the desired alkylation reaction has occurred, the reaction mixture is allowed to cool to a temperature in the range of from about ambient to about 90° C. and thereafter an effective amount of a caustic material, such as calcium hydroxide, is admixed into the reaction mixture to neutralize the acid catalyst. Once the catalyst has been effectively neutralized, the neutralized alkylation reaction effluent is subjected to separation steps, such as vacuum distillation, wherein unreacted starting materials and water are removed. The stripped reaction effluent is then subjected to additional separation steps for removal of the catalyst sludge. The separation of the catalyst sludge can be accomplished by any suitable means, such as filtering the neutralized alkylation reaction effluent or by introducing the neutralized effluent into a separator where the catalyst sludge is removed. When filtration is employed for removing the catalyst sludge, such filtration is preferably carried out while maintaining the neutralized alkylation reaction effluent at a temperature in the range of from about 100° C. to about 120° C.

The resulting alkylation reaction effluent, hereinafter referred to as alkylation product is then alkoxylated. The degree of alkoxylation can vary widely, but will generally be sufficient to provide an alkoxylated alkylate product containing from about 6 to about 30 alkoxy units per molecule. Preferably, the degree of alkoxylation of the alkylate product will be sufficient to provide an alkoxylated alkylate product containing from about 10 to about 16 alkoxy units per molecule. Any suitable alkoxylating procedure can be employed to alkoxylate the alkylate product. Such procedures are well known in the art.

The alkylene oxide constituent employed in the alkoxylation of the alkylate product can be any suitable alkoxy constituent such as ethylene oxide, propylene oxide, butylene oxide, and mixtures thereof. When the alkoxy moiety of the alkoxylates contain a mixture of alkylene oxides, such as propylene oxide and ethylene oxide, it is desirable that the amount of ethylene oxide constituent in the polymer be in the range of from about 10 to about 80 weight percent of the total polymer weight.

We have found that by incorporation a minor effective amount of the before-described alkoxylates into a water-based latex paint composition, the scrub-resistant properties of such paint composition can be readily improved without sacrificing other desired properties of the latex paint composition such as color acceptance, dry grinding, pigment dispersion, and the like. The amount of alkoxylates employed to provide the desired scrub-resistance properties to the latex paint composition can vary widely. However, generally desirable results can be obtained when the amount of alkoxylate employed is from about 0.1 to about 1.5 weight percent of the latex paint composition.

Latex paint compositions are basically formed by combining pigment and an aqueous admixture containing a suspension of polymer particles. However, in order to obtain certain desired properties a number of additives are incorporated into the aqueous admixture. These additives include pigment-dispersing agents, preservatives, thickners, defoamers, and freeze-thaw stabilizers. Latex paint compositions are well known in the art, such compositions varying somewhat according to the particular manufacturer's processing and formulating techniques. However, prior to the present invention latex paint compositions have generally lacked good scrub-resistant properties. We have quite surprisingly found that by incorporating an effective amount of the before-described alkoxylates into latex paint compositions, the scrub-resistant properties of such latex paint compositions can readily be improved.

In order to more fully describe the process for producing the alkoxylates used in the latex paint compositions to improve the scrub-resistant properties of such paint compositions, the following generic chemical reaction system is set forth. However, it is to be understood that the reaction scheme is merely for the purposes of illustration and is not to be construed as unduly limiting the scope of the present invention.

ALKYLATION

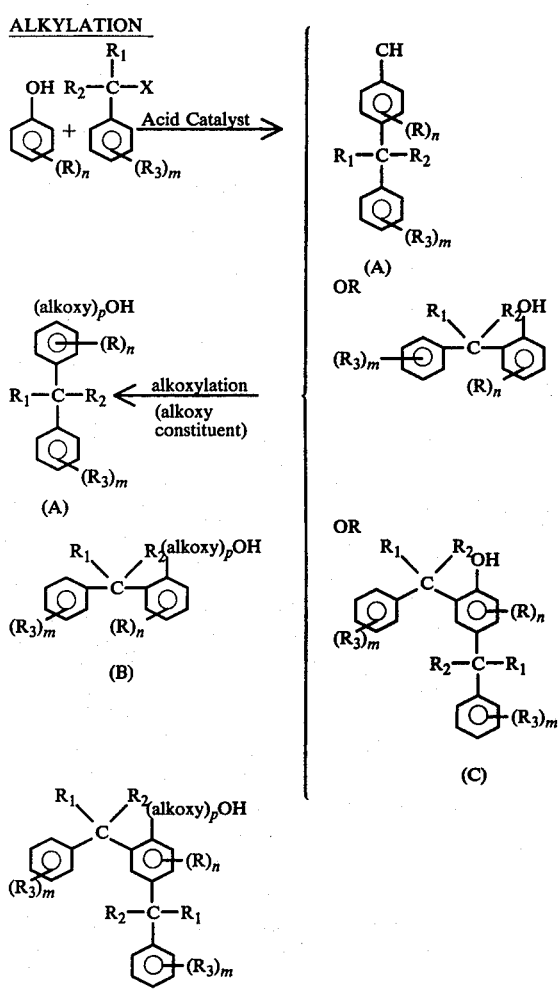

wherein
R is an alkyl group, aryl group or combination thereof,
$n = 0, 1, 2, 3$ or $4$,
$R_1$, $R_2$ and $R_3$ are hydrogen, alkyl, aryl or combinations thereof,
$m = 0, 1, 2, 3, 4$ or $5$,
X is F, Cl, Br or I, and
$p$ is from about 6 to about 30.

The above general reaction scheme clearly illustrates the preparation of the alkoxylates useful in the subject invention. Further, such reaction scheme indicates the complexity of the reaction and the number of isomeric constituents which may be present in the alkoxylates.

In order to further illustrate the details of the process for producing the before-described alkoxylates, and the use of such alkoxylates in latex paint compositions, the following specific examples are given. These examples are presented primarily for the purpose of illustration and any enumeration or details contained therein are not to be interpreted as a limitation of the invention except as indicated in the appended claims. All parts referred to in these examples are parts by weight unless otherwise indicated.

A. Alkylation of Phenolic Compound 518 pounds of molten phenol and 5 pounds of zinc chloride are dissolved in 10 pounds of water and the resulting admixture is charged to a glass lined reaction vessel equipped with a stirrer. The admixture is then heated, while under agitation, to a temperature of about 135° C. Thereafter, 1,425 pounds of benzyl chloride is added slowly. Hydrogen chloride, formed from the reaction between the phenol and the benzyl chloride, is vented to a water scrubber system. After the addition of the benzyl chloride is completed, a nitrogen sparge is commenced and the reaction product is post-reacted at 150° C. for about 1½ hours. Thereafter, unreacted phenol and entrapped hydrogen chloride are removed by vacuum stripping the reaction mixture at 150° C. for 60 to 90 minutes. The resulting product is then cooled to about 70-80° C. and filtered through a coarse screen filter. The filtrate, a viscous yellow liquid alkylate, is analyzed and found to have a hydroxyl number of 190, such indicating a theoretical molecular weight for the alkylate of 295.

B. Alkoxylation of Alkylate

260 Pounds of the alkylate produced in accordance with Preparation A about and 2 pounds of potassium hydroxide are charged into a reaction vessel. The resulting admixture is heated to 116° C. and vacuum stripped to remove trace amounts of water. The admixture is then heated to 145° C., while being agitated, and 470 pounds of ethylene oxide is slowly added to the heated admixture of alkylate and potassium hydroxide while maintaining the temperature of the admixture of 145° C. for about 4 to 5 hours. Thereafter, the resulting ethoxylated product is cooled to room temperature and analyzed for its hydroxyl number. The hydroxyl number indicates that about 13 moles of ethylene oxide has condensed with about one mole of the dibenzylated phenol alkylation product.

EXAMPLE I

The ethoxylated alkylate produced as set forth in Procedure B is incorporated into an acrylic latex paint formulation manufactured under the tradename, Rhoplex AC-388, by Rohm and Haas. The particular formulation employed is identified as Formula No. F-88-3, such being an interior latex flat white formulation. Varying amounts of the ethoxylated alkylate product are employed rather than the manufacturer's suggested dispersant and the properties of the paint compositions are determined and compared with the standard recommended formulation.

| FORMULATION OF ACRYLIC LATEX PAINT COMPOSITIONS | | | | | |
|---|---|---|---|---|---|
| | % | Control | No. 1 | No. 2 | No. 3 |
| Water | (3½) | 67.0 | 67.0 | 67.0 | 67.0 |
| Cellulose Derivative | | 137.0 | 196.0 | 196.0 | 196.0 |
| Dispersant - (a) | (25) | 14.0 | 0.0 | 0.0 | 0.0 |
| Alkoxylated Alkylate | (90) | 0.0 | 2.9(b) | 3.9(c) | 4.9(d) |
| Ethylene Glycol | | 15.0 | 15.0 | 15.0 | 15.0 |
| Coalescing Agent | | 12.5 | 12.5 | 12.5 | 12.5 |
| Mineral Oil Based Defoamer | | 2.0 | 2.0 | 2.0 | 2.0 |
| Mildewcide | | 1.0 | 1.0 | 1.0 | 1.0 |
| TiO$_2$ Pigment | | 300.0 | 300.0 | 300.0 | 300.0 |
| Clay | | 75.0 | 75.0 | 75.0 | 75.0 |
| Collodial Silica (Imsil A-25) | | 50.0 | 50.0 | 50.0 | 50.0 |
| Collodial Silica (Imsil A-15) | | 20.0 | 20.0 | 20.0 | 20.0 |
| Disperse on High Speed Disperser | | | | | |
| Cellulose Derivative | (3½) | 109.0 | 0.0 | 0.0 | 0.0 |
| Water | | | 61.1 | 60.1 | 59.1 |
| Mineral Oil Based Defoamer | | 1.0 | 1.0 | 1.0 | 1.0 |
| Acrylic Latex | (50) | 418.0 | 418.0 | 418.0 | 418.0 |
| Total Weight | Lbs | 1221.5 | 1221.5 | 1221.5 | 1221.5 |
| Total Yield | Gals | 105.3 | 105.3 | 105.3 | 105.3 |
| Total Solids | % | 54.2 | 54.2 | 54.2 | 54.2 |
| PVC | % | 42.9 | 42.9 | 42.9 | 42.9 |

(a)Standard dispersant - sodium salt of a carboxylate polyelectrolyte
(b)75 weight percent of manufacturer's suggested dispersant requirement
(c)100 weight percent of manufacturer's suggested dispersant requirement
(d)125 weight percent of manufacturer's suggested dispersant requirement Comparative data is then accumulated from testing of each of the paint formulations. Such data is as follows:

| ACRYLIC INTERIOR FLAT WHITE | | | | |
|---|---|---|---|---|
| | Control | No. 1 | No. 2 | No. 3 |
| Ease of Dispersion ***Score | 6 | 4 | 4 | 6 |
| Fineness of Grind Heg. | 4 | 3.5 | 4 | 4 |
| Viscosity KU | | | | |
| Initial | 102 | 101 | 104 | 102 |
| 2 Weeks α 120° F | 106 | 108 | 110 | 108 |
| Freeze Thaw | 141+ | 104 | 106 | 104 |
| Max Change | 39+ | 7 | 6 | 6 |
| Ease of Rolling ***Score | 10 | 10 | 10 | 10 |
| Foaming ***Score | 8 | 10 | 8 | 8 |
| Whiteness Index | 87.7 | 88.9 | 87.7 | 87.7 |
| Capacity | | | | |
| Initial | 96 | 96.4 | 96.2 | 95.6 |
| After Freeze Thaw | * | 95.4 | 95.4 | 95.2 | compositions are determined and compared with the standard recommended formulation.

| FORMULATIONS OF POLYVINYL LATEX PAINT COMPOSITIONS | | | | | |
|---|---|---|---|---|---|
| | % | Control | No. 1 | No. 2 | No. 3 |
| Water | | 100.0 | 100.0 | 100.0 | 100.0 |
| Cellulose Derivative | 2½ | 100.0 | 100.0 | 100.0 | 100.0 |
| Dispersant | 25 | 10.0(a) | 0.0 | 0.0 | 0.0 |
| Alkoxylated A.D. | 90 | 0.0 | 2.1(b) | 2.8(c) | 3.5(d) |
| Ethoxylated Nonyl Phenol | | 2.0 | 2.0 | 2.0 | 2.0 |
| Ethylene Glycol | | 20.0 | 20.0 | 20.0 | 20.0 |
| Mineral Oil Based Defoamer | | 3.0 | 3.0 | 3.0 | 3.0 |
| Butoxyethoxy Propanol | | 16.0 | 16.0 | 16.0 | 16.0 |
| Mildewcide | | 0.5 | 0.5 | 0.5 | 0.5 |
| TiO$_2$ | | 185.0 | 185.0 | 185.0 | 185.0 |
| Calcium Carbonate | | 214.0 | 214.0 | 214.0 | 214.0 |
| Disperse on High Speed Disperser | | | | | |
| Water | | 100.0 | 132.9 | 132.2 | 131.5 |
| Cellulose Derivative | 2½ | 100.0 | 75.0 | 75.0 | 75.0 |
| Mineral Oil Based Defoamer | | 3.0 | 3.0 | 3.0 | 3.0 |
| Polyvinyl Acetate Latex | 55 | 262.0 | 262.0 | 262.0 | 262.0 |
| Total Weight | | 1115.5 | 1115.5 | 1115.5 | 1115.5 |
| Total Yield | | 99.2 | 99.2 | 99.2 | 99.2 |
| Total Solids | | 48.5 | 48.5 | 48.5 | 48.5 |
| PVC | | 50.0 | 50.0 | 50.0 | 50.0 |

(a) Standard dispersant - sodium salt of a carboxylate polyelectrolyte
(b) 75 weight percent of manufacturer's suggested dispersant requirement
(c) 100 weight percent of manufacturer's suggested dispersant requirement
(d) 125 weight percent of manufacturer's suggested dispersant requirement Comparative data is then accumulated from testing each of the above-identified paint formulations. Such data is as follows:

| ACRYLIC INTERIOR FLAT WHITE | | | | |
|---|---|---|---|---|
| Sheen | 5 | 5 | 5 | 5 |
| Color Acceptance ***Score | 4 | 8 | 10 | 9 |
| Color Development ***Score | 10 | 10 | 10 | 10 |
| Scrubbability Cycles | 766 | 950 | 975 | 995 |

*Paint is too high in viscosity to test.

| Score | Performance | Effect |
|---|---|---|
| 10 | Excellent | None |
| 9 | | |
| 8 | Very Good | Very Slight |
| 6 | Good | Slight |
| 4 | Fair | Moderate |
| 2 | Poor | Considerable |
| 0 | Very Poor | Severe |

The above data clearly indicates that the incorporation of the alkoxylated alkylate into an acrylic latex paint formulation readily improves the freeze-thaw stability, color acceptance and scrubbability properties of such paint composition. Further, such improved properties can be obtained without sacrificing any other properties of the latex paint composition when employing the alkoxylated alkylate in the amount of 125 weight percent of the normal amount of the prior art dispersant.

EXAMPLE II

The ethoxylated alkylate produced as set forth in Procedure B is incorporated into a polyvinyl acetate latex paint formulation manufactured under the tradename, UCAR 360, by Union Carbide Corporation. The particular formulation employed is identified as Formula No. E-1216, such being an interior latex flat white formulation. Varying amounts of the ethoxylated alkylate product are employed rather than the manufacturer's suggested dispersant and the properties of the paint

| POLYVINYL ACETATE INTERIOR FLAT WHITE | | | | |
|---|---|---|---|---|
| | Control | No. 1 | No. 2 | No. 3 |
| Ease of Dispersion **Score | 10.0 | 10.0 | 10.0 | 10.0 |
| Fineness of Grind Heg. | 4.5 | 4.5 | 5.0 | 4.5 |
| Viscosity KU Initial | 84.0 | 90.0 | 89.0 | 89.0 |
| 2 Weeks α 120° F | 91.0 | 96.0 | 95.0 | 97.0 |
| Freeze Thaw | 88.0 | 94.0 | 93.0 | 93.0 |
| Max Change | 7.0 | 6.0 | 6.0 | 8.0 |
| Ease of Rolling **Score | 10.0 | 10.0 | 10.0 | 10.0 |
| Foaming **Score | 10.0 | 8.0 | 8.0 | 8.0 |
| Whiteness Index | 85.2 | 85.6 | 85.8 | 86.1 |
| Capacity Initial | 91.2 | 90.0 | 90.0 | 90.5 |
| After Freeze Thaw | 89.5 | 87.8 | 89.2 | 89.1 |
| Sheen | 2.0 | 2.0 | 2.0 | 2.0 |
| Color **Score Acceptance | 10.0 | 4.0 | 2.0 | 2.0 |
| Color Development **Score | 10.0 | 10.0 | 10.0 | 10.0 |
| Scrubbability Cycles | 270.0 | 325.0 | 330.0 | 355.0 |

| Score | Performance | Effect |
|---|---|---|
| 10 | Excellent | None |
| 9 | | |
| 8 | Very Good | Very Slight |
| 6 | Good | Slight |
| 4 | Fair | Moderate |
| 2 | Poor | Considerable |
| 0 | Very Poor | Severe |

The above data clearly indicates that the incorporation of the alkoxylated alkylate into a polyvinyl acetate latex paint formulation readily improves the scrubbability properties of such paint compositions. However, in order to obtain such improved scrubbability properties, one sacrifices a portion of the foam resistance and color acceptance properties.

Having thus described the invention, we claim:

1. A method for improving the scrub-resistant properties of a water-based latex paint composition which consists essentially of incorporating into said latex paint composition a minor effective amount of an alkoxylate of an alkylation reaction product formed by the acid catalyzed alkylation of a phenolic compound with an alkylation agent selected from the group consisting of benzl halide and a substituted benzyl halide, said alkoxylate being further characterized as containing from about 6 to about 30 alkoxy units per molecule.

2. The method for improving the scrub-resistant properties of a water-based latex paint composition according to claim 1 wherein said phenolic compound is represented by the formula

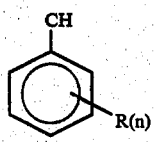

wherein R is selected from the group consisting of an alkyl group containing from 1 to about 12 carbon atoms, an aryl group, and an alkylaryl group in which the alkyl moiety contains from 1 to about 12 carbon atoms, $n$ is an integer of from 0 to 4, inclusive, and wherein said alkylating agent is represented by the formula

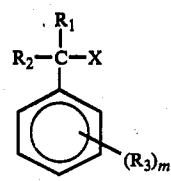

wherein $R_1$, $R_2$ and $R_3$ are each selected from the group consisting of hydrogen, an alkyl group containing from 1 to about 12 carbon atoms, an aryl group, and an alkylaryl group in which the alkyl moiety contains from 1 to about 12 carbon atoms, X is a halogen, and $m$ is an integer of from 0 to 5, inclusive.

3. The method for improving the scrub-resistant properties of a water-based latex paint composition of claim 2 wherein said minor effective amount is from about 0.1 to about 1.5 weight percent, based on the weight of said latex paint composition and wherein said alkoxylate contains from about 10 to about 16 alkoxy units per molecule.

4. The method for improving the scrub-resistant properties of a water-based latex paint composition according to claim 3 wherein said alkoxy units are selected from the group consisting of ethyleneoxy, propyleneoxy, butyleneoxy and mixtures thereof.

5. The method for improving the scrub-resistant properties of a water-based latex paint composition according to claim 4 wherein said alkoxy units are a mixture of ethyleneoxy and propyleneoxy and said ethyleneoxy constituent is present in an amount of from about 10 to about 80 weight percent of the total alkoxy units.

* * * * *